June 17, 1947.   S. H. BARTLEY   2,422,520
INSTRUMENT FOR MEASURING CUTANEOUS SENSITIVITY
Filed Sept. 17, 1946   2 Sheets-Sheet 1
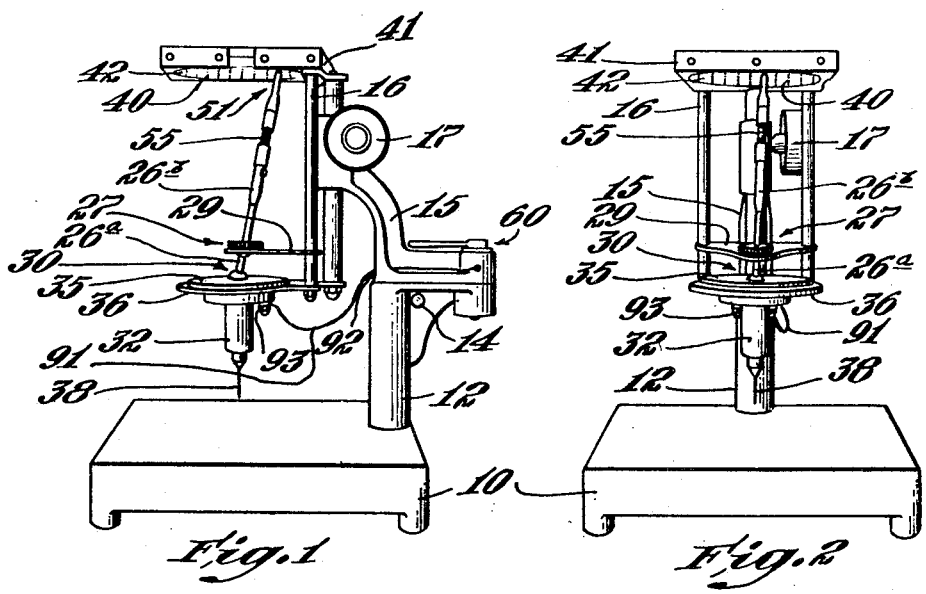
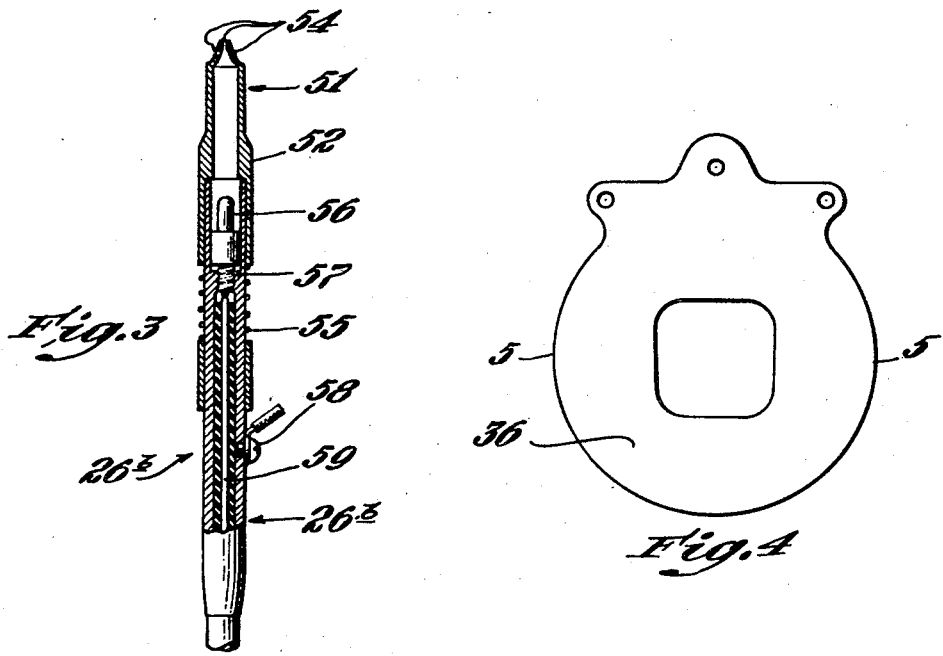
Inventor
S. Howard Bartley
by Andrew Amann
his Att'ys.

June 17, 1947. S. H. BARTLEY 2,422,520
INSTRUMENT FOR MEASURING CUTANEOUS SENSITIVITY
Filed Sept. 17, 1946 2 Sheets-Sheet 2
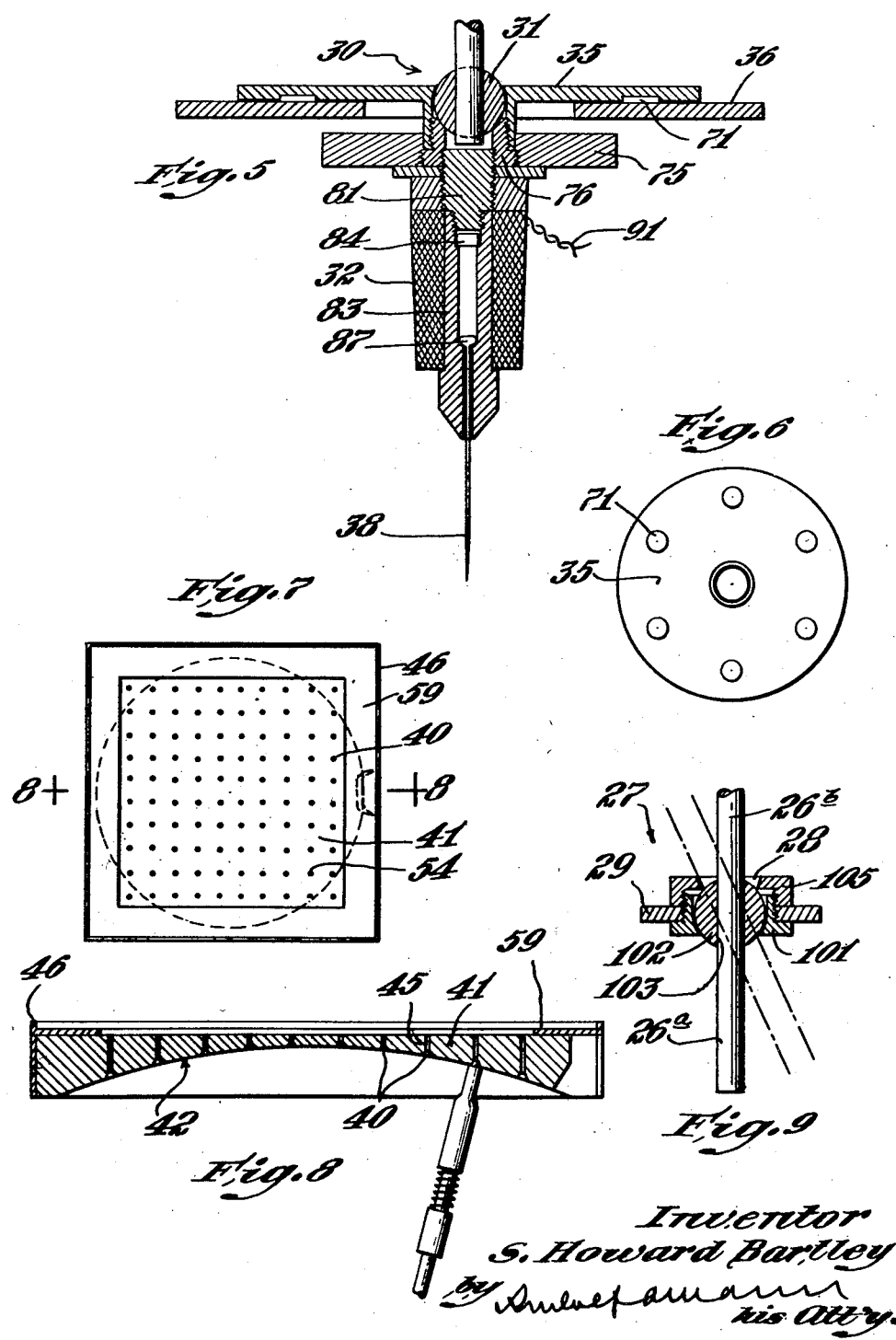

Patented June 17, 1947

2,422,520

UNITED STATES PATENT OFFICE 2,422,520

INSTRUMENT FOR MEASURING CUTANEOUS SENSITIVITY

Samuel Howard Bartley, Hanover, N. H.

Application September 17, 1946, Serial No. 697,594

12 Claims. (Cl. 128—2)

The present invention relates to physiological measuring instruments, more particularly of the type permitting the study of cutaneous sensitivity.

In cases such as nerve injury, or brain damage, the neuro-surgeon and neurologist frequently explore areas of the skin, to detect possible loss in sensitivity to touch. For this purpose, manually applied horse-hairs, or other styli have been used. This procedure has decided limitations in accuracy. The hairs cannot be applied with known and controlled intensity of pressure, or for equal duration from trial to trial. To make cutaneous exploration fully acceptable as a routine procedure, an instrumental means for controlling the variables of stimulus type, duration and intensity is desirable. This same instrument by its design should allow the exploration or test to be delegated to a laboratory technician, and free the clinician from having to perform it himself. Heretofore the fact that the clinician has had to make the exploration himself, unfortunately has reduced the number of times such tests have been employed although, especially also with the high number of nerve injuries due to the war, the need for this exploration will in the future be greater than ever.

It is the principal object of the present invention to provide an instrument which permits rapid exploration of a skin area regarding sensitivity thereof, which instrument is rugged, comparatively inexpensive and yet exact and adaptable for various purposes and uses in its field. Other objects are to provide such an instrument which obviates the necessity of imprinting a pattern upon the area to be explored, which furnishes initially a directly readable and permanent record of any investigation performed therewith, which permits the application, uniformly and independent of the uncertainties of manual operation, of stimulation of predetermined location, intensity, type and duration; and to provide such an instrument which permits definitely predetermined and exact stimulation of very closely adjacent points of contact.

In one of its aspects, the instrument according to the invention incorporates a stimulating means which is positively correlated to recording and localizing means such as to provide a predetermined and if desirable adjustable ratio between the spatial relation of explored points and record of exploration; this is preferably accomplished by arranging testing and recording means on respective sides of a universally pivoted lever. In another aspect, the invention contemplates the direct correlation of the test means localizing and recording instrumentalities by localizing the above mentioned lever by means of a perforated template whose openings indicate, by way of the peculiar arrangement of a record surface and a light source, the record point corresponding to any selected stimulus point; and in yet another aspect, the invention employs a template for locating a stimulating stylus on the required loci on the skin.

Additional features of the invention are a disc bearing for maintaining parallel movement of the stimulating stylus, derived from a radially moving carrier; relative movability of base and exploring element so as to permit stimulation of points of a large area such as the middle of the human back; an electrically operated stylus; and an electric commutator device for avoiding loose wire interference with the operation of the instrument.

A very few instruments for the experimental study of cutaneous sensitivity have been constructed for laboratory use in the past quarter century. None of these have incorporated the above indicated essential features. In fact, to my knowledge, no instrument was ever designed especially for and put into routine use in the clinic. The present instrument is intended particularly for clinical use, as will become apparent from the relation of its construction to the following procedures used in clinical explorations.

The usual procedure in exploring skin areas with horse-hairs has been first to place on the skin a grid of closely spaced ink-points, with a rubber stamp designed for the purpose. The hair is touched very lightly to the skin at each one of the ink-points a number of times in random order and the patient, who is not viewing the area explored, is asked to respond each time he senses the contact. The usefulness of the exploration depends upon its spatial, intensity, and durational accuracies. The contacts must be exactly on the points and the pressure and duration of each application must be kept as nearly uniform as possible.

These and other objects, aspects and features will appear from the following description of a typical practical embodiment of the invention illustrating its general characteristics; this description refers to a drawing in which:

Figs. 1 and 2 are side and front view perspectives, respectively, of an instrument according to the invention;

Fig. 3 is a longitudinal section through the upper portion of the stylus lever shown in Figs. 1 and 2;

Fig. 4 is a plan view of the socket device shown in Figs. 1 and 2;

Fig. 5 is a section on lines 5—5 of Fig. 4;

Fig. 6 is a bottom view of the cover disc shown in Fig. 5;

Fig. 7 is a top view of the record holder;

Fig. 8 is a section on lines 8—8 of Fig. 7; and

Fig. 9 is an axial section through the ball pivot socket shown in Figs. 1 and 2.

An instrument according to the invention will first be described in its principal parts. It is mounted on a platform base 10 and an upright post 12 on which is pivoted an arm 15. The latter carries the remainder of the instrument by means of carriage posts 16. The elevation of these posts is adjustable by means of a knurled knob 17 through a conventional V-groove transport which serves in preference to a rack-and-pinion arrangement.

A chief feature of the instrument is the use of a lever and template to place the stylus into prescribed positions in the horizontal plane. This lever is shown at 26. It has a fixed fulcrum, the ball and socket arrangement 27, which is fastened to posts 16 by means of bracket 29 and will be described more in detail below with reference to Fig. 9. The shorter arm 26a of the lever 26 fits into a second ball and socket device 30 which positions a solenoid unit 32 in the horizontal plane. A disc 35 (Fig. 5) which rides on base 36 keeps the solenoid in a vertical position as it is moved horizontally. This solenoid carries stylus 38. Energization of the solenoid holds the stylus in its "up" position. When the current is broken, the stylus drops and makes contact with the skin. The timing for this is controlled by a circuit interrupter mechanism, which may be of any suitable design and is not a part of the present invention.

The lever 26 is moved to place the stylus in desired positions from trial to trial in routine use of the instrument. To place the stylus in known and predetermined positions, the nose of the long arm 26b of the lever snaps into small depressions 40 milled in the under side of a base plate 41 (Fig. 8), which forms the template. The lower face of this base is machined to form the part-surface 42 of a sphere whose radius is the long arm 26b of the lever, with the center at 27. Thus the lever arm need be but one length to reach all of the positioning depressions. The template may for example have one hundred depressions equally spaced, forming a square grid of ten rows of ten depressions. The depressions may be 1 centimeter apart, and if the ratio of the long and short arms of the lever is for example 5 to 1, the movement of the long arm of the lever from one depression to the next in the row moves the stylus 38 a distance of 2 millimeters. Since the grid of depressions is a fixed set of relationships, the stylus can be repeatedly and precisely placed in any one of one hundred positions, at will. If two or three small inkspots are placed on the skin as reference points corresponding to two or three widely spaced stylus positions, then all other positions are predetermined and can be returned to repeatedly.

Holes 45 are drilled from the depressions on the underside of plate 41 to the upper surface which is flat. A rail or bead 46 may surround the four sides of this square plate so as to hold in fixed position a square sheet of recording paper of the proper size.

The above mentioned nose of the long arm 26b of the lever 26 is indicated at 51 (Fig. 3). It is perforated with tiny channels 54 through which light from a very small electric lamp 56 shines upward through that hole 45 of plate 41 at which the lever is stationed at the time. The light indicates through the paper the position of the lever.

As shown in Fig. 3, the nose 51 of the lever 26 consists of a tube 52 which fits over the lever arm 26b and which is held against plate 42 by a spiral spring 55 (Figs. 1, 2, and 3). Thus when the lever is moved into an appropriate position the tapered nose of the tube snaps into the depression and holds the lever in a fixed position. A lamp 56 is mounted within the tubular end of lever 26 by means of a base 57, and supplied with current through binding post 58 and grounding wire 59.

In order that the stylus may be applied to a broad area of the skin's surface, such as the human back, arm 15 can be swung 180° into a position which is entirely clear of base 10. This base may be weighted with lead so as not to tip when the arm is swung out of its normal position shown in Fig. 1. The arm can be locked in the chosen working position by pivot lock 60.

As previously mentioned, the upper surface of plate 41 serves as a carrier for a sheet of recording paper. With the light from lamp 56 of the lever nose shining through the paper to indicate the lever position, the technician can put a plus or minus sign or other symbol to record response or failure to respond to stylus contacts with the skin when the stylus is in each of the one hundred positions. In order to hold the paper flat on the carrier surface, a metal frame 69 may be provided for laying on top of the paper. The center of the metal frame is dimensioned (leaving a ½ inch rim) to expose all of the indicator light holes. Either plain paper or printed forms in which the holes (i. e. stylus positions) are numbered or otherwise marked, can be employed as recording sheets.

Disc 35 of the pivot portion 30 rests on base bracket plate 36 through the intermediary of six small discs 71 of felt which are embedded in the under surface of 35 as shown in Figs. 5 and 6. In this way, noise, and other objectionable features of friction are avoided. These six cushion discs also serve to wipe the bearing surfaces on 36 clean.

Base plate 36 is shaped as shown in Fig. 4 and has a square hole so as to allow for horizontal movement of the connection between disc 35 and the solenoid 32 over sufficient range.

The upper part of the socket for ball 31 is provided by disc 35 which is drilled from below upward and tapered at the top so as to retain the ball, as shown in Fig. 5. The flange 75 on the under side of disc 36 is threaded part way on the inside. This thread carries the plug fitting 76 which seats the ball on the under side. The lower or short arm 26a of the lever 26 snugly slides through the hole in the center of ball 31. The plug 76 is flanged as indicated and threads on it carry disc 75. Discs 35 and 75 therefore form the upper and lower bearing surfaces respectively, for the solenoid 32, which is thereby not allowed to tip out of vertical. The solenoid is fastened to the assembly already described by threaded coupling 81 of iron which screws into fitting 76 and the solenoid. This iron serves three additional purposes. The first is to hold the Bakelite or hard rubber cylindrical guide 83 for the stylus. The second purpose is to provide a seat for a button 84 of sponge rubber, which serves as a damper to quiet the upward terminal excursion of the stylus. The third purpose is to concentrate the magnetic field. The stylus 38 is a needle-like member with a flange 87 on its upper tip so as to prevent it from falling out during the absence of current in the solenoid. The stylus should not drop its full excursion to reach the skin, when the instrument is being used.

The solenoid 32 is activated by suitable direct current, for example rectified alternating current.

The electrical power line plugs into the side of base 10 and from there divides on the under side of the base where one circuit supplies through a resistance, the light in the lever arm and the other, the solenoid. The lines 91 emerge through a grummet 92 of arm 15, and are attached to the solenoid by means of binding posts 93.

The main pivot, shown in detail in Fig. 9, consists of a lower socket portion 101 which is shaped to fit ball 102 which has a bore 103 engaging rod 26. Socket 101 is screwed into bracket plate 29. The ball is secured on socket 101 by means of a knurled cover 105 that is screwed to the upper portion of the thread of socket 101. The conical recess 28 of cover 105 permits the necessary swing of lever 26 as indicated in dot and dash lines.

I claim:

1. Apparatus for measuring cutaneous sensitivity comprising base means, fulcrum means mounted on said base means, template means having a pattern of fastening means mounted on one side of said fulcrum means, a probe base mounted on the other side of said fulcrum means, and a lever pivoted on said fulcrum, said lever having on one side means for engaging said fastening means and on the other side probe means adapted to be guided on said probe base.

2. Apparatus for measuring cutaneous sensitivity comprising base means supporting a fulcrum and template means having a pattern of fastening means arranged on a spherical surface centered at said fulcrum, a lever pivoted on said fulcrum, probe stylus means mounted on said lever, and releasable means adapted to engage said fastening means likewise mounted on said lever.

3. Apparatus for measuring cutaneous sensitivity comprising base means, fulcrum means mounted on said base means, template means having a pattern of fastening means mounted on the side facing said fulcrum means and arranged on a spherical surface centered at said fulcrum means, a probe base mounted on said base means on the other side of said fulcrum means and defining a flat surface which is normal to an axis through said fulcrum means and the apex of said spherical surface, and a lever pivoted on said fulcrum, said lever having on one side means for engaging said fastening means and on the other side probe means adapted to be guided on said flat surface.

4. Apparatus for measuring cutaneous sensitivity comprising base means supporting a fulcrum and template means having a pattern of locating means and a record surface covering said pattern, a lever pivoted on said fulcrum, probe means mounted on said lever, and releasable means adapted to engage said fastening means likewise mounted on said lever.

5. Apparatus for measuring cutaneous sensitivity comprising base means, fulcrum means mounted on said base means, template means having a pattern of locating means and a record surface covering said pattern mounted on one side of said fulcrum means, and a lever pivoted on said fulcrum, said lever having on one side means for engaging and illuminating said fastening means and on the other side probe means.

6. Apparatus for measuring cutaneous sensitivity comprising base means supporting a fulcrum and template means having a pattern of locating means and a recording surface covering said pattern, said template means being adapted to transmit light from said locating means to said recording surface, a lever pivoted on said fulcrum, probe means mounted on said lever, and releasable means adapted to engage and to illuminate said locating means likewise mounted on said lever.

7. Apparatus for measuring cutaneous sensitivity comprising base means, fulcrum means mounted on said base means, template means having a pattern of fastening means mounted on said base means on one side of said fulcrum means, a probe base mounted on said base means on the other side of said fulcrum means and defining a guiding surface, and a lever pivoted on said fulcrum, said lever having on one side means for engaging said fastening means and on the other side probe stylus means adapted to be guided normal to said surface.

8. Apparatus for measuring cutaneous sensitivity comprising a base; a socket mounted on said base and carrying pivot means; a template mounted on said base on one side of said socket, said template having a spherical surface centered approximately at said pivot means, facing said socket and having engaging means arranged in a regular pattern; a lever fastened to said pivot means, said lever having on one end locking means fitting said engaging means; a probe holder mounted on said base on the other side of said socket, said holder including a face substantially normal to an axis through said pivot means and the apex of said surface, a plate sliding resting on said surface and carrying pivot means containing the other end of said lever; and a probe member fastened to said plate and including means for controlling a probe pin movable substantially normal to said face.

9. Apparatus for measuring cutaneous sensitivity comprising a base; a socket mounted on said base and carrying pivot means; a template mounted on said base on one side of said socket, said template having a spherical surface facing said socket and carrying engaging means arranged in a regular pattern; a lever fastened to said pivot means, said lever having on one end locking means fitting said engaging means; a probe holder mounted on said base on the other side of said socket, said holder including a platform having a window, a plate slidingly resting on said platform and carrying pivot means containing the other end of said lever; and a probe carrier fastened to said plate and including a solenoid controlling a probe pin which is adapted to be moved when energizing current is supplied to the solenoid.

10. Apparatus for measuring cutaneous sensitivity comprising a base; a spherical socket mounted on said base and carrying a ball; a template mounted on said base on one side of said socket, said template having a curved surface on the side facing said socket and on the other side a flat surface, engaging means arranged on said curved surface in a regular pattern, and perforations between said depressions and said flat surface; a lever fastened to said ball, said lever having on one end a spring controlled sleeve with locking means fitting said engaging means and pressed thereagainst when abutting against said plate, and a light source within said sleeve, said locking means being perforated to transmit light through said perforations to said flat surface; a probe holder mounted on said base on the other side of said socket, said holder including a platform having a window, a socket carrier slidingly resting on said platform and having a socket securing a ball with a perforation containing the other end of said lever; and a probe stylus carrier fastened to said socket carrier and extending through said window and including a solenoid having a hollow core extending substantially normally to said platform and containing a probe pin slidingly moving therein and pulled inwardly when energizing current is supplied to the solenoid.

11. Apparatus for measuring cutaneous sensitivity comprising a base; a spherical socket mounted on said base and carrying a ball; a template mounted on said base on one side of said socket, said template having a spherical surface on the side facing and centered at said socket, and having depressions arranged in a regular pattern; a lever fastened to said ball, said lever having on one end a spring controlled tip fitting said depressions and pressed thereinto when abutting against said plate; a proble holder mounted on said base on the other side of said socket, said holder including a platform which is substantially normal to an axis through said ball and the apex of said surface and which platform has a window; a socket carrier slidingly resting on said platform and having a socket securing a ball with a perforation containing the other end of said lever; and a proble stylus carrier fastened to said socket carrier, extending through said window and including a solenoid having a hollow core which is substantially normal to said platform and contains a probe pin slidingly moving therein and pulled inwardly when energizing is supplied to the solenoid.

12. Apparatus for measuring cutaneous sensitivity comprising a base; a spherical socket mounted on said base and carrying a ball; a template mounted on said base on one side of said socket, said template having a spherical surface on the side facing and centered at said socket, on the other side a flat surface substantially normal to an axis through said ball and the apex of said surface, depressions arranged on said spherical surface in a regular pattern, and perforations between said depressions and said flat surface; a lever fastened to said ball, said lever having on one end a spring controlled sleeve with a tip fitting said depressions and pressed thereinto when abutting against said plate, and a light source within said sleeve, said tip being perforated to transmit light through said perforations to said flat surface; a probe holder mounted on said base on the other side of said socket; said holder including a platform which is substantially normal to said axis and has a window; a socket carrier slidingly resting on said platform and having a socket securing a ball with a perforation containing the other end of said lever; and a probe stylus carrier fastened to said socket carrier, extending through said window and including a solenoid having a hollow core which is substantially normal to said platform and contains a probe pin slidingly moving therein and pulled inwardly when energizing current is supplied to the solenoid.

S. HOWARD BARTLEY.

REFERENCES CITED

The following references are of record in the file of this patent:

UNITED STATES PATENTS

| Number | Name | Date |
| --- | --- | --- |
| 1,842,323 | Gluzek | Jan. 19, 1932 |
| 2,301,567 | Morse | Nov. 10, 1942 |
| 2,315,160 | Newstedt et al. | Mar. 30, 1943 |

FOREIGN PATENTS

| Number | Country | Date |
| --- | --- | --- |
| 305,865 | Germany | May 27, 1918 |